(12) United States Patent
Richter et al.

(10) Patent No.: US 7,875,234 B2
(45) Date of Patent: Jan. 25, 2011

(54) METHOD OF MAKING AND METHOD OF USE OF FINE-GRAINED POLYARYLENE ETHER KETONE POWDER

(75) Inventors: Alexander Richter, Oer-Erkenschwick (DE); Patrick Kreidler, Recklinghausen (DE); Holger Renners, Velen-Ramsdorf (DE); Wolfgang Christoph, Marl (DE); Heinrich Temme, Duelmen (DE); Christian Bierhaus, Dortmund (DE)

(73) Assignee: Evonik Degussa GmbH, Essen (DE)

( * ) Notice: Subject to any disclaimer, the term of this patent is extended or adjusted under 35 U.S.C. 154(b) by 223 days.

(21) Appl. No.: 11/722,261

(22) PCT Filed: Nov. 22, 2005

(86) PCT No.: PCT/EP2005/056153

§ 371 (c)(1), (2), (4) Date: Feb. 4, 2008

(87) PCT Pub. No.: WO2006/067017

PCT Pub. Date: Jun. 29, 2006

(65) Prior Publication Data

US 2009/0280263 A1 Nov. 12, 2009

(30) Foreign Application Priority Data

Dec. 21, 2004 (DE) .................. 10 2004 062 762

(51) Int. Cl.
*C04B 35/64* (2006.01)
*C08G 8/02* (2006.01)

(52) U.S. Cl. ..................... 264/604; 528/125

(58) Field of Classification Search ............... 528/125; 264/604

See application file for complete search history.

(56) References Cited

U.S. PATENT DOCUMENTS

| 4,656,220 | A | 4/1987 | Jadamus et al. |
| 6,054,177 | A * | 4/2000 | Endoh et al. ............. 427/203 |
| 2005/0207931 | A1* | 9/2005 | Hesse et al. ............. 419/10 |
| 2006/0134419 | A1 | 6/2006 | Monsheimer et al. |

FOREIGN PATENT DOCUMENTS

| EP | 0 377 170 | 7/1990 |
| EP | 1 464 662 | 10/2004 |

OTHER PUBLICATIONS

U.S. Appl. No. 12/466,425, filed May 15, 2009, Richter, et al.
U.S. Appl. No. 11/813,881, filed Jul. 13, 2007, Richeter, et al.
U.S. Appl. No. 11/746,718, filed May 10, 2007, Richter, et al.
U.S. Appl. No. 11/747,980, filed May 14, 2007, Richter, et al.

* cited by examiner

*Primary Examiner*—Frederick J Parker
(74) *Attorney, Agent, or Firm*—Oblon, Spivak, McClelland, Maier & Neustadt, L.L.P.

(57) ABSTRACT

A milling process for the preparation of fine-particled polyarylene ether ketone comprises milling a porous polyarylene ether ketone having a BET surface area of more than 1 $m^2/g$.

17 Claims, No Drawings

METHOD OF MAKING AND METHOD OF USE OF FINE-GRAINED POLYARYLENE ETHER KETONE POWDER

BACKGROUND OF THE INVENTION

1. Field of the Invention

The invention relates to a fine-particled polyarylene ether ketone (PAEK), its preparation by milling of porous PAEK and its use.

2. Discussion of the Background

The milling of polymers using a very wide range of milling units and milling processes is an established technology which is already in use for a very wide range of milled products, for example for polyesters, polyamides or polyolefins. These polymers are usually milled from the corresponding commercial granular form in a cryogenic milling process to give the corresponding powder. For this purpose, pinned-disk mills or fluidized-bed mills are usually used at operating temperatures of up to −60° C. PAEK and in particular polyether ether ketone (PEEK) are distinguished, inter alia, by outstanding tribological and mechanical properties; they can therefore be milled only with very great difficulty and at high costs to give a fine powder. DE 38 44 457 A1 describes the cold milling of PAEK on a fluidized-bed mill, fine powders having a mean particle size of 40 µm or less being obtained. A disadvantage here, however, is the yield, which, at not more than 7.5 kg/h, remains substantially below the usual throughputs of a milling apparatus. The technical difficulties of milling a PAEK are evident here.

There has therefore been occasional approaches to bypass the milling step in powder production and to obtain pulverulent or very finely pulverulent PAEK by alternative routes, Thus, U.S. Pat. No. 5,910,558 describes the preparation of PAEK micropowders by prilling of melts or by spray-drying of the solutions. However, this process has not become established, owing to the high cost of apparatus and the low process stability.

A further method disclosed in WO 99/50339 comprises mixing PAEK with another polymer and thus establishing the particle shape of the PAEK. After dissolution of the other polymer in a suitable solvent, the pulverulent PAEK is exposed. However, this method is very complicated.

SUMMARY OF THE INVENTION

Starting from this, it was the object of the invention to provide a less complicated milling process having an improved milling yield for the preparation of fine-particled PAEK powder.

This object is achieved by a process in which a porous PAEK having a BET surface area of more than 1 m²/g, preferably of more than 4 m²/g, particularly preferably of more than 8 m²/g and especially preferably of more than 12 m²/g is milled to give a powder.

DETAILED DESCRIPTION OF THE INVENTION

The porous PAEK is as a rule prepared by reaction of an aromatic dihalogen compound with a bisphenol and/or a halophenol in the presence of alkali metal or alkaline earth metal carbonate or bicarbonate in a high-boiling aprotic solvent to give a PAEK, discharge of the melt and allowing the latter to solidify, optionally milling, for example in a hammer mill, extraction of the resulting particles with one or more organic solvents for removal of the reaction solvent and with water for removal of the inorganic salts, and subsequent drying. The particles to be extracted can be prepared from the reaction mixture not only by milling but also by granulation of an extrudate, application of drops to a cooled metal belt, prilling or spray-drying. The degree of porosity obtained after the extraction depends in particular on the content of reaction solvent in the material to be extracted. In this context, it is advantageous to remove only part of the reaction solvent during the spray-drying. Otherwise, the method by which the particles to be extracted are produced is not critical.

The process for the preparation of PAEK with subsequent extraction is described in a large number of patent applications, for example EP-A-0 001 879, EP-A-0 182 648, EP-A-0 244 167 and EP-A-0 322 151.

In the invention, however, a PAEK which may have been prepared by another process and which is present in compact form, for example as granules, can also be dissolved in a suitable high-boiling aprotic solvent, whereupon the hot solution, as described above for the melt obtained in the reaction, is converted into particulate form and extracted with one or more organic solvents.

According to the prior art, the high-boiling aprotic solvent is preferably a compound of the formula

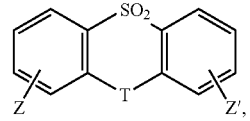

in which T is a direct bond, an oxygen atom or two hydrogen atoms; Z and Z' are hydrogen or phenyl groups. Said compound is preferably diphenyl sulfone.

The PAEK contains units of the formulae

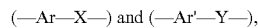

in which Ar and Ar' are a divalent aromatic radical, preferably 1,4-phenylene, 4,4'-biphenylene and 1,4-, 1,5- or 2,6-naphthylene. X is an electron-attracting group, preferably carbonyl or sulfonyl, while Y is another group, such as O, S, CH₂, isopropylidene or the like. Here, at least 50%, preferably at least 70% and particularly preferably at least 80% of the groups X should be a carbonyl group, while at least 50%, preferably at least 70% and particularly preferably at least 80% of the groups Y should consist of oxygen.

In the particularly preferred embodiment, 100% of the groups X consist of carbonyl groups and 100% of the groups Y of oxygen. In this embodiment, the PAEK may be, for example, a polyether ether ketone (PEEK; formula I), a polyether ketone (PEK; formula II), a polyether ketone ketone (PEKK; formula III) or a polyether ether ketone ketone (PEEKK; formula IV), but other arrangements of the carbonyl and oxygen groups are of course also possible.

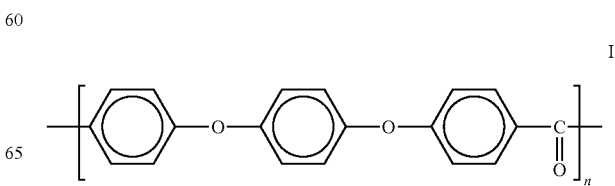

-continued

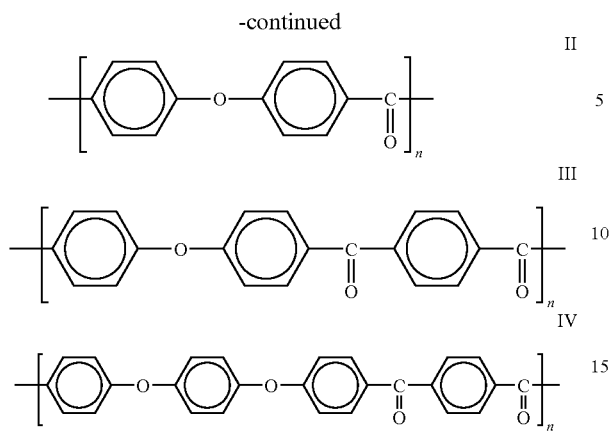

The PAEK is in general semicrystalline, which manifests itself, for example, in the DSC analysis by the detection of a crystallite melting point $T_m$, which in most cases is of the order of magnitude of 300° C. or higher. However, the teaching of the invention is also applicable to amorphous PAEK. In general, it is true that sulfonyl groups, biphenylene groups, naphthylene groups or bulky groups Y, such as, for example, an isopropylidene group, reduce the crystallinity.

In a preferred embodiment, the viscosity number, measured according to DIN EN ISO 307 on a solution of 250 mg of PAEK in 50 ml of 96 percent by weight strength $H_2SO_4$ at 25° C., is from about 20 to 150 cm$^3$/g and preferably from 50 to 120 cm$^3$/g.

The BET surface area is determined according to DIN ISO 9277.

The porous PAEK can be milled at room temperature or elevated temperature but, in order to improve the milling and the milling yield, it is advantageous to mill at a lower temperature, preferably below 0° C., particularly preferably below −20° C. and particularly preferably below −40° C. Inter alia, pinned-disk mills, fluidized-bed jet mills or impact disk mills are suitable for milling. Here, the porous structure of the PAEK to be milled ensures weak points which lead to fracture under the abovementioned conditions.

The milled material can subsequently be classified or sieved. Depending on the milled material and subsequent separation method used, a finely pulverulent PAEK having a number average particle diameter ($d_{50}$) of from 1 to 300 μm, preferably from 4 to 200 μm, particularly preferably from 10 to 150 μm, especially preferably from 15 to 120 μm and very particularly preferably from 20 to 100 μm can be obtained. In a particularly advantageous embodiment, a very finely pulverulent PAEK having a $d_{50}$ of from 15 to 80 μm and a $d_{90}$ of less than 160 μm and preferably one having a $d_{50}$ of from 20 to 50 μm and a $d_{90}$ of less than 100 μm is prepared in this manner.

The determination of the particle diameter and the distribution thereof is effected by laser diffraction according to DIN ISO 13320-1.

Additives, such as, for example, inorganic pigments, such as titanium dioxide, carbon black and the like, or processing assistants can subsequently be added to the PAEK powder, for example as a dry blend.

The very finely pulverulent PAEK thus obtained can be used for coating, for example of metal (e.g. steel) or ceramic articles, by means of electrostatic coating, fluidized-bed coatings or coatings with a PAEK suspension in water. In these cases, it may contain, for example, $Al_2O_3$ or $SiO_2$ (for example Aerosil) as an inorganic processing auxiliary. It is also suitable for the production of composites, for example by impregnation of reinforcing fabrics with the powder and subsequent pressing at a sufficiently high temperature. In addition, it can also be processed, for example, by sintering or hot isostatic pressing to give shaped articles.

The invention is to be illustrated by way of example below.

EXAMPLES

Example 1

Particles of PEEK having a BET surface area of 50 m$^2$/g and a mean particle diameter of 500 μm were milled with the aid of a cryogenically operating pinned-disk mill (Hosokawa Alpine CW 160). The PEEK particles were transported by means of a conveying screw into a milling chamber and cooled to −50° C. with liquid nitrogen during this procedure. In this milling chamber, the PEEK particles were accelerated to 220 m/s by rotating pinned disks. At this velocity, they struck the pins mounted on the pinned disk and were thus exposed to strong impact which led to fracture of the particles. This occurred with a throughput of PEEK particles of 15 kg/h. A micronized product containing 30% by weight of particles smaller than 100 μm (sieve analysis using Alpine air-jet sieve according to DIN EN ISO 4610) left the milling chamber.

The micronization was followed by the process step comprising separation. There, the comminuted PEEK particles were fractionated with the aid of an Alpine air-jet sieve with downstream cyclone. The fractionation was effected at a mesh size of 80 μm. The powder thus obtained was characterized by a $d_{10}$ of 16.7 μm, $d_{50}$ of 52.6 μm and $d_{90}$ of 113.8 μm.

Example 2

The procedure was as in example 1, but with a throughput of 20 kg/h. A micronized particle containing 30% by weight of particles smaller than 100 μm left the milling chamber.

The micronization was followed by the process step comprising separation. There, the comminuted PEEK particles were fractionated with the aid of a zigzag classifier. The operating parameters of the zigzag classifier were: revolutions 10 000 min$^{-1}$, carrier air 65 m$^3$/h. The powder thus obtained was characterized by a $d_{10}$ of 8.5 μm, $d_{50}$ of 21.4 μm and $d_{90}$ of 54.9 μm.

COMPARATIVE EXAMPLE 1

An attempt was made to comminute PEEK granules (BET surface area less than 0.1 m$^2$/g) with the aid of a cryogenically operating pinned-disk mill (Hosokawa Alpine CW 160). The PEEK particles were conveyed by means of a conveying screw into a milling chamber and cooled to −70° C. with liquid nitrogen during this procedure. In this milling chamber, the PEEK particles were accelerated to 220 m/s by rotating pinned disks. At this speed, they struck the pins mounted on the pinned disk and were thus subjected to strong impact. The throughput of PEEK granules was 15 kg/h. A product containing 2% by weight of particles smaller than 100 μm left the milling chamber. After this procedure had been carried out three times, a fraction of 7% by weight smaller than 100 μm resulted. Owing to the low efficiency during the milling, separation was dispensed with.

The invention claimed is:

1. A process for the preparation of a polyarylene ether ketone powder, comprising:
   milling a polyarylene ether ketone having a BET surface area of more than 1 m²/g to obtain said polyarylene ether ketone powder.

2. The process as claimed in claim 1, wherein the porous polyarylene ether ketone is milled at a temperature below 0° C.

3. The process as claimed in claim 1, wherein the milled product is classified or sieved.

4. The process as claimed in claim 1, wherein the polyarylene ether ketone powder obtained has a number average particle diameter $d_{50}$ of from 1 to 300 µm.

5. The process as claimed in claim 1, wherein the polyarylene ether ketone is a PEEK, a PEK, a PEKK or a PEEKK.

6. The process as claimed in claim 1, wherein the polyarylene ether ketone has a viscosity number of from 20 to 150 cm³/g.

7. A polyarylene ether ketone powder, prepared according to claim 1.

8. The polyarylene ether ketone powder as claimed in claim 7, which further comprises admixed inorganic pigments or processing auxiliaries.

9. A method of producing a composite comprising impregnating reinforcing fabrics with the powder of claim 7 and pressing the reinforced fabrics.

10. The method of claim 9, further comprising producing of a shaped article by sintering or hot isostatic pressing of the composite to obtain the shaped article.

11. The process as claimed in claim 1, wherein the polyarylene ether ketone comprises units of the formulae (—Ar—X—) and (—Ar'—Y—), in which Ar and Ar' are a divalent aromatic radical, X is an electron-attracting group, Y is group different from X.

12. The process as claimed in claim 11, wherein, in the polyarylene ether ketone, Ar and Ar' are independently 1,4-phenylene, 4,4'-biphenylene, 1,4-naphthylene, 1,5-naphthylene or 2,6-naphthylene; X is carbonyl or sulfonyl; Y is O, S, $CH_2$ or isopropylidene.

13. The process as claimed in claim 11, wherein at least 50% of the groups X are a carbonyl group, at least 50% of the groups Y are oxygen.

14. The process as claimed in claim 1, wherein the polyarylene ether ketone is semicrystalline.

15. The process as claimed in claim 1, wherein the polyarylene ether ketone has a crystallite melting point $T_m$ as determined by DSC analysis of 300° C. or higher.

16. The process as claimed in claim 1, wherein the polyarylene ether ketone is amorphous.

17. The process as claimed in claim 1, wherein a viscosity number, measured according to DIN EN ISO 307 on a solution of 250 mg of PAEK in 50 ml of 96 percent by weight strength $H_2SO_4$ at 25° C., is from 50 to 120 cm³/g.

* * * * *